US010702887B2

(12) United States Patent
Nishi et al.

(10) Patent No.: US 10,702,887 B2
(45) Date of Patent: Jul. 7, 2020

(54) THIN FILM FORMING APPARATUS AND TRANSPARENT CONDUCTIVE FILM

(71) Applicant: NIKON CORPORATION, Tokyo (JP)

(72) Inventors: Yasutaka Nishi, Tokyo (JP); Makoto Nakazumi, Yamato (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/407,344

(22) Filed: May 9, 2019

(65) Prior Publication Data
US 2019/0262858 A1 Aug. 29, 2019

Related U.S. Application Data

(60) Division of application No. 15/097,956, filed on Apr. 13, 2016, now Pat. No. 10,328,453, which is a
(Continued)

(30) Foreign Application Priority Data

Oct. 30, 2013 (JP) .................................. 2013-225549

(51) Int. Cl.
B05D 3/06 (2006.01)
B05D 1/02 (2006.01)
(Continued)

(52) U.S. Cl.
CPC .............. B05D 1/02 (2013.01); B05D 3/065 (2013.01); C23C 24/00 (2013.01); C23C 24/08 (2013.01);
(Continued)

(58) Field of Classification Search
None
See application file for complete search history.

(56) References Cited

U.S. PATENT DOCUMENTS 4,321,822 A * 3/1982 Marple ................ G01N 1/2208
73/28.06
5,916,640 A * 6/1999 Liu ........................ B05B 5/043
239/698
(Continued)

FOREIGN PATENT DOCUMENTS

CN 1284997 C 11/2006
JP 2001-259494 9/2001
(Continued)

OTHER PUBLICATIONS

International Search Report dated Feb. 3, 2015, in corresponding International Patent Application No. PCT/JP2014/078064.
(Continued)

Primary Examiner — Charles Capozzi

(57) ABSTRACT

A thin film forming apparatus including: a first chamber configured to generate a mist of a dispersion liquid, and including an outlet; a second chamber configured to receive the generated mist from the first chamber

Related U.S. Application Data continuation of application No. PCT/JP2014/078064, filed on Oct. 22, 2014.

(51) Int. Cl.
- *G06F 3/044* (2006.01)
- *C23C 24/00* (2006.01)
- *C23C 24/08* (2006.01)
- *G06F 3/041* (2006.01)
- *B05D 1/00* (2006.01)

(52) U.S. Cl.
CPC ........... *G06F 3/041* (2013.01); *G06F 3/044* (2013.01); *B05D 1/60* (2013.01); *G06F 2203/04103* (2013.01)

(56) References Cited

U.S. PATENT DOCUMENTS

| | | | |
|---|---|---|---|
| 6,358,567 | B2 | 3/2002 | Pham |
| 6,680,242 | B2 | 1/2004 | Ohtsu |
| 7,618,687 | B2 | 11/2009 | Duffy |
| 2003/0232128 | A1 | 12/2003 | Furusawa et al. |
| 2005/0186871 | A1 | 8/2005 | Hockaday |
| 2011/0192789 | A1 | 8/2011 | Gogotsi |

FOREIGN PATENT DOCUMENTS

| | | |
|---|---|---|
| JP | 2004-223378 | 8/2004 |
| JP | 2007-238393 | 9/2007 |
| JP | 2011-224503 | 11/2011 |
| JP | 2013-129868 | 7/2013 |
| WO | WO 2011/126039 A1 | 10/2011 |
| WO | WO 2011/151889 A1 | 12/2011 |

OTHER PUBLICATIONS

Chinese Office Action dated Nov. 28, 2016 in corresponding Chinese Patent Application No. 201480052051.7.
Chinese Office Action dated Jul. 5, 2017 in corresponding Chinese Patent Application No. 201480052051.7.
U.S. Office Action dated Jul. 28, 2017 in U.S. Appl. No. 15/097,956.
U.S. Office Action dated Dec. 1, 2017 in U.S. Appl. No. 15/097,956.
U.S. Office Action dated Mar. 27, 2018 in U.S. Appl. No. 15/097,956.
U.S. Office Action dated Jun. 18, 2018 in U.S. Appl. No. 15/097,956.
U.S. Office Action dated Sep. 5, 2018 in U.S. Appl. No. 15/097,956.
U.S. Office Action dated Dec. 3, 2018 in U.S. Appl. No. 15/097,956.
U.S. Notice of Allowance dated Mar. 6, 2019 in U.S. Appl. No. 15/097,956.
U.S. Appl. No. 15/097,956, filed Apr. 13, 2016, Yasutaka Nishi, et al., Nikon Corporation.

* cited by examiner

FILM FORMING APPARATUS USING MIST (FIRST CHAMBER)    (SECOND CHAMBER)    (THIRD CHAMBER)

FIG. 3
FIRST STEP 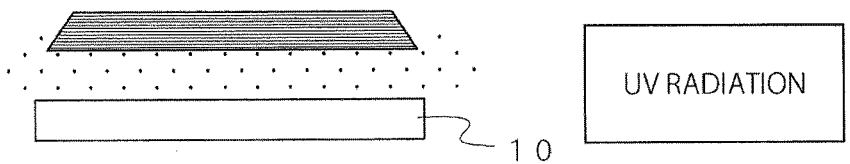 UV RADIATION
SECOND STEP 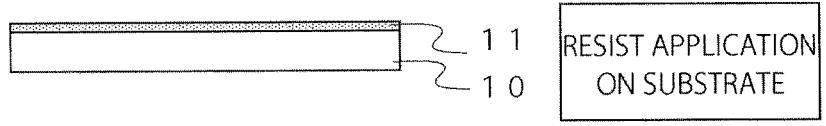 RESIST APPLICATION ON SUBSTRATE
THIRD STEP 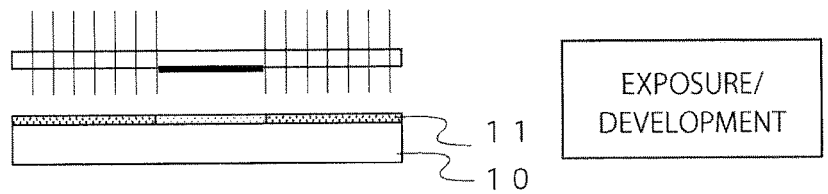 EXPOSURE/ DEVELOPMENT
FOURTH STEP 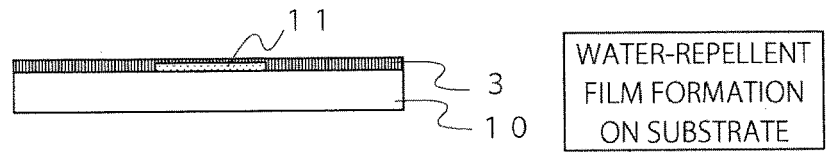 WATER-REPELLENT FILM FORMATION ON SUBSTRATE
FIFTH STEP 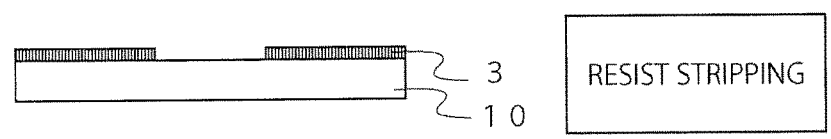 RESIST STRIPPING
SIXTH STEP 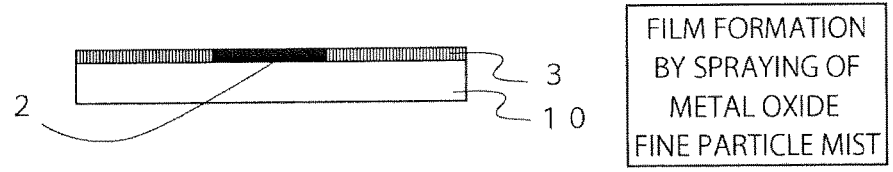 FILM FORMATION BY SPRAYING OF METAL OXIDE FINE PARTICLE MIST
SEVENTH STEP 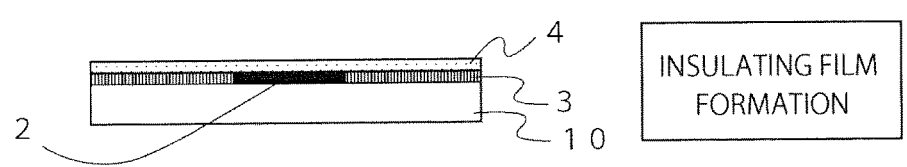 INSULATING FILM FORMATION

FIG. 8

SHEET RESISTANCE FOR HEATING / DRYING TEMPERATURE

| FILM FORMING TEMPERATURE(°C) | SHEET RESISTANCE (Ω/sq.) |
|---|---|
| 25 | 60.0 |
| 40 | 80.0 |
| 60 | 500.0 |
| 80 | — |
| 100 | — |
| 120 | — |
| 140 | — |
| 160 | — |
| 180 | — |
| 200 | — |

SEM IMAGE OF OBTAINED ITO FILM OF COMPARATIVE EXAMPLE

FIG. 10

SURFACE RESISTANCE VALUE AND VISIBLE LIGHT TRANSMITTANCE
FOR EACH DRYING TEMPERATURE

| DRYING TEMPERATURE (°C) | SURFACE RESISTANCE VALUE(MΩ/sq.) | TRANSMITTANCE (%) (INCIDENT LIGHT WAVELENGTH OF 550nm) |
|---|---|---|
| 150 | 20.0 | 81.3 |
| 175 | 15.0 | 82.5 |
| 200 | 6.0 | 81.5 |

FIG. 13

RESULT OF OBSERVATION OF SURFACE GEOMETRIES

| SUBSTRATE TEMPERATURE | NOT HEATED (ROOM TEMPERATURE) | 60°C | 80°C |
|---|---|---|---|
| SEM IMAGE | | | |

FIG. 14

RELATIONSHIP BETWEEN SUBSTRATE TEMPERATURE
IN FILM FORMATION AND SURFACE RESISTANCE

| HEATING TEMPERATURE (°C) IN FILM FORMATION | SURFACE RESISTANCE VALUE ($\Omega$/sq.) |
|---|---|
| 25 | 60.0 |
| 40 | 500.0 |
| 60 | 6000 |
| 80 | — |

SEM IMAGE OF ITO FILM ON WATER-REPELLENT PATTERNED SUBSTRATE

SEM IMAGE OF GZO FILM ON WATER-REPELLENT PATTERNED SUBSTRATE

WATER-REPELLENT PORTION

HYDROPHILIC PORTION
(FILM FORMING PORTION)

MIST APPLICATION ONTO SUBSTRATE HEATED TO 60°C

HYDROPHILIC   WATER-REPELLENT
  PORTION          PORTION
(FILM FORMING
   PORTION)

MIST APPLICATION ONTO SUBSTRATE HEATED TO 80°C

RESULT OF SPRAYING MIST PERPENDICULARLY TO SUBSTRATE

THIN FILM FORMING APPARATUS AND TRANSPARENT CONDUCTIVE FILM

CROSS-REFERENCE TO RELATED APPLICATIONS

This application is a divisional application of U.S. patent application Ser. No. 15/097,956, filed on Apr. 13, 2016, which is a § 111 (a) by-pass continuation application, which claims the benefit under 35 U.S.C. § 371 of PCT International Patent Application No. PCT/JP2014/78064, filed Oct. 22, 2014, which claims the foreign priority benefit under 35 U.S.C. § 119 of Japanese Patent Application No. 2013-225549, filed Oct. 30, 2013, the contents of which are incorporated herein by reference.

FIELD

The present invention relates to a method of manufacturing a thin film and to a transparent conductive film.

BACKGROUND

A transparent conductive film formed of indium tin oxide (ITO), zinc oxide (ZnO), or the like is widely used for a transparent electrode of a liquid crystal display or a solar cell. Such a transparent conductive film is typically formed by sputtering.

As a method other than sputtering, for example, in International Patent WO2011/151889A, there is disclosed formation of a metal oxide film using "an apparatus configured to form a metal oxide film, including a first container (5A) holding a material solution (10) containing a metal, a second container (5B, 18) holding hydrogen peroxide, a reaction container (1) having a substrate (2) arranged therein and having a heater (3) configured to heat the substrate, a first pathway (L1) connecting the first container and the reaction container, for supplying the material solution from the first container to the reaction container, and a second pathway (L2) connecting the second container and the reaction container, for supplying the hydrogen peroxide from the second container to the reaction container" In the film forming apparatus disclosed in International Patent WO2011/151889A, the material solution containing the metal and the hydrogen peroxide are reacted with each other on the heated substrate to form the metal oxide film.

It is an object of the present invention to provide a novel method of obtaining a thin film to replace the related art described above.

SUMMARY

One embodiment of the present invention has been made in order to attain the above-mentioned object, and according to the one embodiment of the present invention, there is provided a method of manufacturing a thin film, including: generating mist of a dispersion liquid containing fine particles; supplying the generated mist of the dispersion liquid onto a substrate; and drying the dispersion liquid supplied onto the substrate.

Further, in the method of manufacturing a thin film according to the one embodiment of the present invention, the fine particles contained in the generated mist of the dispersion liquid may each have a particle size of 100 nm or less.

Further, in the method of manufacturing a thin film according to the one embodiment of the present invention, the substrate may include a resin and have flexibility.

Further, in the method of manufacturing a thin film according to the one embodiment of the present invention, the drying the dispersion liquid may be performed at a temperature that is lower than a softening point of the substrate.

Further, in the method of manufacturing a thin film according to the one embodiment of the present invention, the drying the dispersion liquid may be performed at a temperature of 10° C. or higher and 40° C. or lower.

Further, the method of manufacturing a thin film according to the one embodiment of the present invention may further include forming, on the substrate, a hydrophilic/water-repellent pattern including a hydrophilic portion and a water-repellent portion, and the supplying the generated mist may be performed to the substrate having the hydrophilic/water-repellent pattern formed thereon in the forming a hydrophilic/water-repellent pattern.

Further, the method of manufacturing a thin film according to the one embodiment of the present invention may further include, after the drying the dispersion liquid, radiating an ultraviolet ray to the substrate, and the supplying the generated mist may be performed again to the substrate to which the ultraviolet ray is radiated in the radiating an ultraviolet ray.

Further, in the method of manufacturing a thin film according to the one embodiment of the present invention, in the supplying the generated mist, the fine particles contained in the mist that is supplied before the radiating an ultraviolet ray and the fine particles contained in the mist that is supplied after the radiating an ultraviolet ray may be different.

Further, in the method of manufacturing a thin film according to the one embodiment of the present invention, the ultraviolet ray radiated in the radiating an ultraviolet ray may at least have a wavelength of 200 nm or less.

Further, in the method of manufacturing a thin film according to the one embodiment of the present invention, in the supplying the generated mist, the substrate may be tilted from a horizontal plane.

Further, in the method of manufacturing a thin film according to the one embodiment of the present invention, in the supplying the generated mist, the substrate may be tilted from a plane orthogonal to a direction of the supply.

Further, in the method of manufacturing a thin film according to the one embodiment of the present invention, the fine particles may be metal oxide fine particles including anyone of indium, zinc, tin, and titanium.

Further, according to another embodiment of the present invention, there is provided a transparent conductive film, which is manufactured by the above-mentioned method of manufacturing a thin film.

It is possible to provide a novel method of obtaining a thin film to replace the related art.

BRIEF DESCRIPTION OF DRAWINGS

FIG. 3 is sectional views (part one) for illustrating an exemplary method of manufacturing a conductive film according to a modification example of the embodiment.

FIG. 8 is a table for showing sheet resistances of the obtained metal oxide films for various heating/drying temperatures.

FIG. 10 is a table for showing surface resistance values and visible light transmittances of obtained GZO films.

FIG. 13 is SEM images of obtained GZO films.

FIG. 14 is a table for showing a relationship between a substrate temperature in film formation and a surface resistance.

DESCRIPTION OF EMBODIMENTS

An exemplary embodiment of the present invention is described below with reference to the attached drawings.

Figure 1:
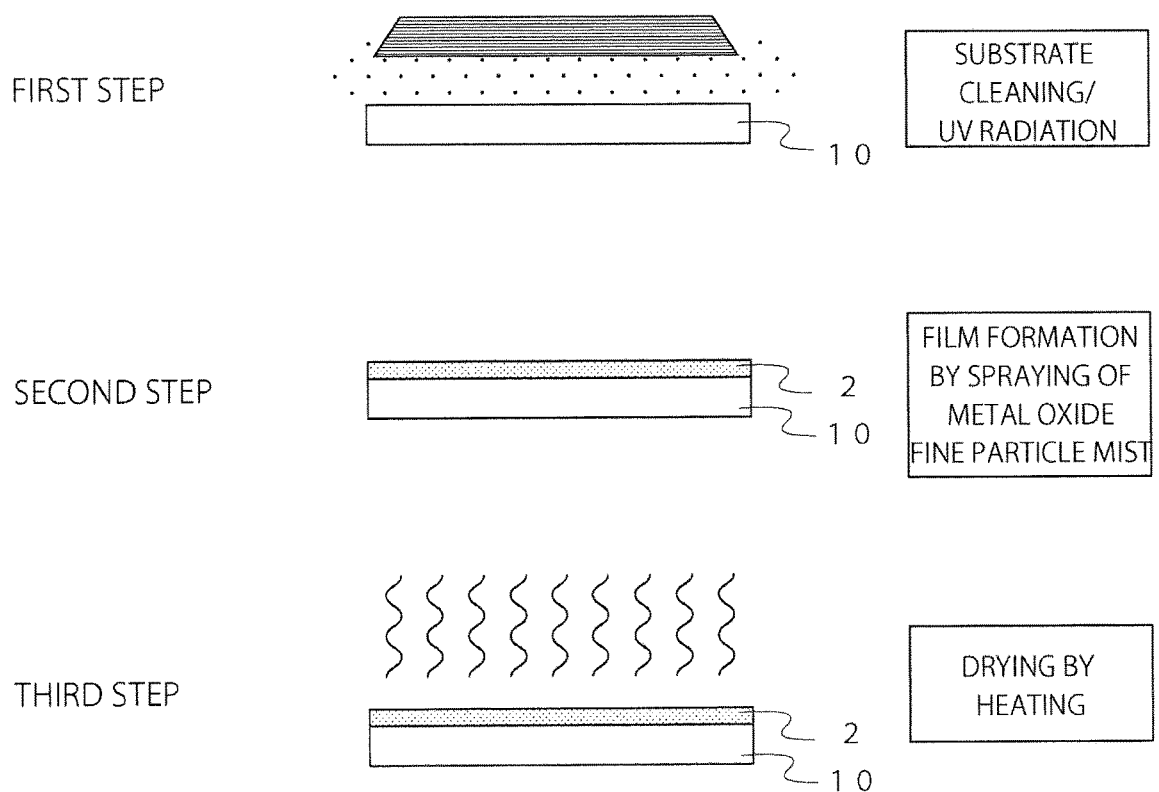
FIG. 1 is sectional views for illustrating an exemplary method of forming a metal oxide film according to an embodiment of the present invention.

FIG. 1 is sectional views for illustrating an exemplary method of forming a thin film according to this embodiment.

(First Step)

First, a substrate 10 is prepared. As a material of the substrate 10, substrate materials commonly used can be used. For example, glass, polyethylene terephthalate (PET), polyethylene naphthalate (PEN), polyether sulfone (PES), polyether imide, polyether ether ketone, polyphenylene sulfide, polyacrylate, polyimide, polycarbonate (PC), cellulose triacetate (TAC), or cellulose acetate propionate (CAP) can be used.

The substrate 10 is cleaned as necessary. As a cleaning method, a general method such as ultrasonic cleaning can be used. After that, an ultraviolet (UV) ray is radiated to the substrate 10. In radiating a UV ray, a general UV radiation apparatus is used, and it is desired that an ultraviolet ray having a wavelength of 200 nm or less (for example, from 10 nm to 200 nm) be radiated. The radiation of a UV ray removes an impurity on a surface of the substrate 10 to hydrophilize the surface.

(Second Step)

Then, through spraying mist of a dispersion liquid containing fine particles onto the substrate 10, a metal oxide film 2 is formed.

Figure 2:
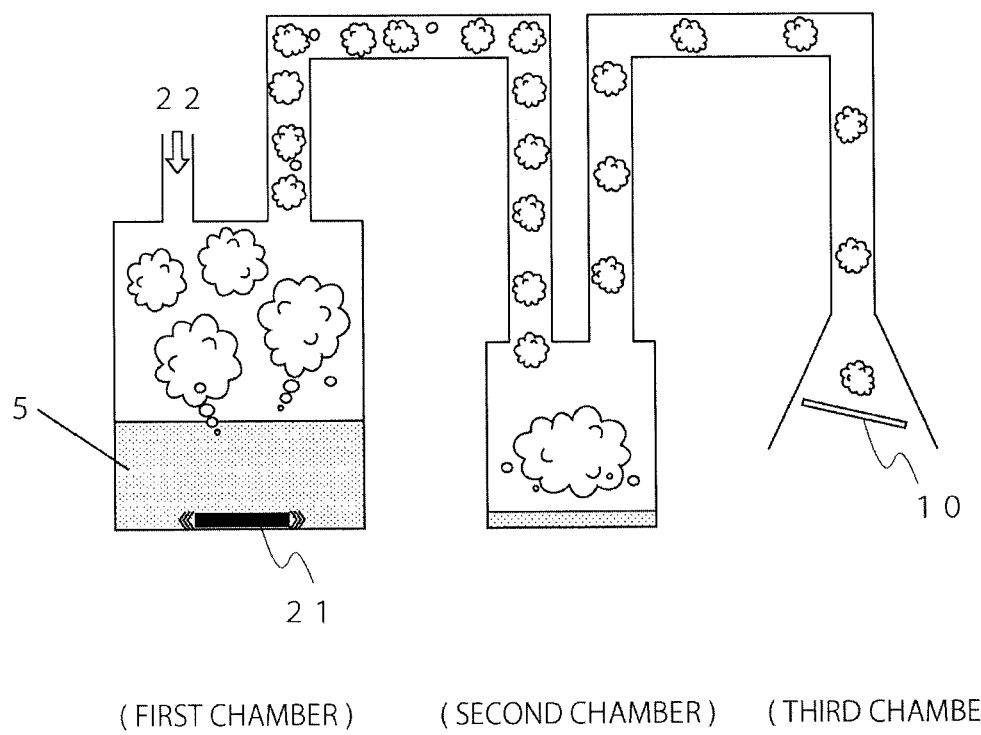
FIG. 2 is an illustration of an exemplary film forming apparatus according to the embodiment.

FIG. 2 is an illustration of an exemplary film forming apparatus according to this embodiment. The film forming apparatus includes a first chamber configured to generate mist containing fine particles, a second chamber as a mist trap, which is configured to homogenize the mist, and a third chamber configured to spray the mist onto the substrate 10.

The first chamber holds a material solution 5 as a dispersion liquid in which fine particles are dispersed in a dispersion medium. As the fine particles, conductive metal fine particles of indium, zinc, tin, titanium, or the like, or metal oxide fine particles of at least one thereof can be used. These may be solely used, or two or more thereof may be arbitrarily used in combination. The fine particles are nanofine particles having a particle size of from 1 nm to 100 nm. Note that, as the particle size, for example, an average of major axes and minor axes of fine particles determined from a SEM image can be used. Note that, in this embodiment, description is made assuming that metal oxide fine particles are used as the fine particles.

The dispersion medium may be any type of medium insofar as the fine particles can be dispersed therein, and water, an alcohol such as isopropyl alcohol (IPA) or ethanol, or a mixture thereof can be used. Note that, air 22 for forming a flow path of the mist is flowed into the first chamber.

The first chamber holds an ultrasonic vibrator 21 as well. The ultrasonic vibrator 21 generates the mist of the dispersion liquid containing the metal oxide fine particles. It is desired that the mist have a particle size of 10 μm or less (for example, from 1 μm to 10 μm). The mist generated in the first chamber is sent to the second chamber via a tube arranged at the first chamber. In the second chamber, excess mist accumulates in a lower portion of the chamber, and mist with a homogenized particle size is sent to the third chamber via a tube arranged at the second chamber. It is desired that mist having a particle size of 5 μm or less (for example, from 1 μm to 5 μm) be sent from the second chamber to the third chamber.

The substrate 10 is set in the third chamber, and the mist sent from the second chamber is sprayed onto the substrate 10. The mist is sprayed onto the substrate 10 for a predetermined time in the third chamber. Through vaporization of the dispersion medium in the mist attached to the substrate 10, the metal oxide film is formed on the surface of the substrate 10. Note that, when a fixed time elapses after the spray, new mist attaches onto the substrate 10 before the mist is vaporized, and thus, the dispersion liquid that becomes liquid droplets flows down, and a uniform metal oxide film is no longer formed on the substrate 10. A point in time at which the spraying of the mist onto the substrate 10 is stopped may be a point in time at which the mist including the metal oxide fine particles is liquefied to flow down from the substrate 10, or may be a point in time at which a metal oxide film having a desired thickness is formed on the substrate 10.

When the substrate 10 is excessively heated in the third chamber, the substrate 10 may be softened to be deformed. Therefore, in the third chamber, it is desired that the mist be sprayed at a temperature lower than a softening point of the substrate 10 to form the metal oxide film. Further, when the substrate 10 is heated to a predetermined temperature or higher when the mist is sprayed thereonto, the metal oxide fine particles attached to the substrate 10 coagulate to form a metal oxide film having a high resistance value. Therefore, it is further desired that the mist be sprayed at a temperature that is equal to or lower than 40° C. (for example, from 10° C. to 40° C.) to form the metal oxide film.

Note that, the softening point as used herein means a temperature at which, when the substrate is heated thereto, the substrate is softened to start to be deformed, and can be determined by, for example, a testing method in conformance with JIS K7207 (method A).

As described in detail below, when a metal oxide film is selectively formed on the substrate 10, by selectively forming a water-repellent film on the substrate 10 in advance, the mist is attached to a hydrophilic portion. At this time, if the substrate 10 is placed so as to be level, the dispersion liquid attached to a water-repellent portion is not repelled, and thus, the metal oxide film cannot be selectively formed. Therefore, it is desired that, in the third chamber, the mist be sprayed onto the substrate 10 that is tilted from a horizontal plane.

Similarly, it is desired that, in the third chamber, the mist be sprayed onto the substrate 10 that is tilted from a plane orthogonal to a direction of the spraying of the mist. This is for the purpose of removing excess metal oxide fine particles attached to the water-repellent portion due to momentum of the sprayed mist.

Note that, the mist trap in the second chamber of the film forming apparatus may be omitted. This enables formation of the metal oxide film on the substrate with a simpler apparatus.

Further, with regard to a method of generating the mist, other than generation using the ultrasonic vibrator 21 described above, an electrostatic method in which the mist is generated through direct application of a voltage to a thin tube for spraying liquid droplets, a pressurizing method in which generated mist is dispersed by colliding, with a liquid, a gas having an increased flow velocity with pressure applied thereto, a rotary disk method in which liquid droplets are dropped onto a disk rotating at high speed and generated mist is dispersed by a centrifugal force, an orifice vibration method in which, when liquid droplets are passed through microsized holes formed in an orifice plate, the liquid droplets are cut by vibrations applied thereto by a piezoelectric element or the like, thereby generating microsized liquid droplets, or the like can be used. The method of generating the mist is selected as appropriate among these in accordance with the cost, the performance, or the like. It is to be understood that a plurality of methods may be used in combination to generate the mist.

(Third Step)

Description is made again with reference to FIG. 1. After that, the substrate 10 having the metal oxide film 2 formed thereon is heated to be dried. Similarly to the case described above, it is desired that the heating temperature at this time be lower than the softening point of the substrate 10. The heating may be performed in a low vacuum of about 30 Pa, or may be performed in an atmosphere of Ar gas. An appropriate thermal condition is used depending on a condition of the film formation or the like. Note that, in this step, the drying is not necessarily required to be performed by heating. For example, the drying may be performed by setting the substrate 10 at room temperature for a predetermined time.

Note that, the first step described above is not an indispensable step. The first step is a step as a pretreatment for the mist to be attached onto the substrate 10 in the second step. It is enough that the mist is attached onto the substrate 10, and a method of attaining this is not limited.

Through the processes described above, the metal oxide film is formed on the substrate 10. By repeating the processes from the first step to the third step as necessary, a metal oxide film as a second layer can be obtained. In this case, the first step of cleaning the substrate can be omitted. Note that, by using, as metal oxide fine particles included in the mist of the second layer, the same material as that of the metal oxide fine particles included in the mist of the first layer, a metal oxide film having a sufficient thickness can be obtained. Alternatively, by using different materials for the metal oxide film for the first chamber and for the metal oxide film for the second chamber, different conductive films can be formed in accordance with the use or the target thereof.

As described above, according to this embodiment, in the step of forming the thin film, the film is formed without heating the substrate. Therefore, a metal oxide film having a low resistance value can be obtained. Further, a film can be effectively formed on a substrate that is sensitive to heat.

Modification Example

Next, a modification example of this embodiment is described.

FIG. 3 is sectional views for illustrating an exemplary method of manufacturing a conductive film according to this modification example. In this modification example, the metal oxide film formed according to the embodiment described above is used to manufacture the conductive film. The manufactured conductive film is used in a touch panel or the like as a capacitance switch.

(First Step)

First, a UV ray is radiated to the substrate 10. The UV radiation is for the purpose of removing an impurity on the substrate 10. Note that, the first step may be omitted.

(Second Step)

Next, a resist 11 is applied onto the substrate 10. The resist 11 is a general photosensitive material used as a photoresist. In the application, a publicly known application method such as spin coating, dip coating, or spraying can be used.

(Third Step)

Next, the substrate 10 is selectively exposed. Specifically, a photomask that is patterned as desired in advance is used to selectively expose part of the resist 11 on the substrate 10. By developing the substrate 10 after that, the resist 11 that is patterned into a desired shape is obtained. Note that, here, for convenience sake, a case in which a photomask that selectively masks the substrate 10 in an x direction thereof (side to side direction in FIG. 3) is used in the exposure is described.

(Fourth Step)

Next, a water-repellent film 3 is formed on the substrate 10. As the water-repellent film 3, an existing material such as a fluorine-based water repellent is used. As the water-repellent film 3, for example, 3M™Novec™EGC-1720 (manufactured by 3M Japan Limited) can be used. As a method of forming the water-repellent film 3, similarly to the case of the application of the resist 11 described above, an existing film forming method is used to form the film.

(Fifth Step)

Next, the resist 11 on the substrate 10 is peeled. The resist 11 is peeled using an existing peeling liquid such as acetone. By peeling the resist 11, the water-repellent film formed on the resist 11 is peeled as well. In this way, the water-repellent film 3 that is patterned as desired can be obtained.

(Sixth Step)

Next, the mist of the dispersion liquid containing the metal oxide fine particles is sprayed onto the substrate 10 to form the metal oxide film 2. Specifically, the film forming apparatus illustrated in FIG. 2 is used to spray the mist, thereby forming the film. The water-repellent film 3 is selectively formed on the substrate 10, and thus, the liquefied dispersion liquid attaches to a portion of the substrate 10 that has no water-repellent film 3 formed thereon, that is, to the hydrophilic portion, and the metal oxide film 2 is selectively formed. Note that, the dispersion liquid that temporarily attaches to the water-repellent portion flows down through the water-repellent portion due to the tilt of the substrate 10 to attach to an adjacent hydrophilic portion, or flows down through the substrate 10 to accumulate at a bottom portion of the third chamber. The metal oxide film 2 formed on the substrate 10 is, after that, heated to be dried.

(Seventh Step)

Next, an insulating film 4 is formed on the substrate 10. Note that, a UV ray can be radiated to the substrate before the insulating film 4 is formed. This is for the purpose of, by radiating a UV ray to the water-repellent film 3, reducing the water repellent property to help formation of the insulating film 4. However, when, for example, a highly viscous material such as an organic material is used to form the insulating film 4, it is not necessary to consider the effect of the water repellent property of the water-repellent film 3, and thus, it is not necessary to radiate a UV ray. Taking into consideration of the material of the insulating film 4 and the like, a UV ray is radiated as necessary, and after that, the insulating film 4 is formed on the substrate 10.

The insulating film 4 is formed on the water-repellent film 3 and on the metal oxide film 2. As the insulating film 4, for example, a nonconductive material such as $SnO_2$ is used. As a method of forming the insulating film 4, an existing method such as spin coating, bar coating, or dip coating is used to apply a predetermined material on an entire surface to form the film.

Figure 4:
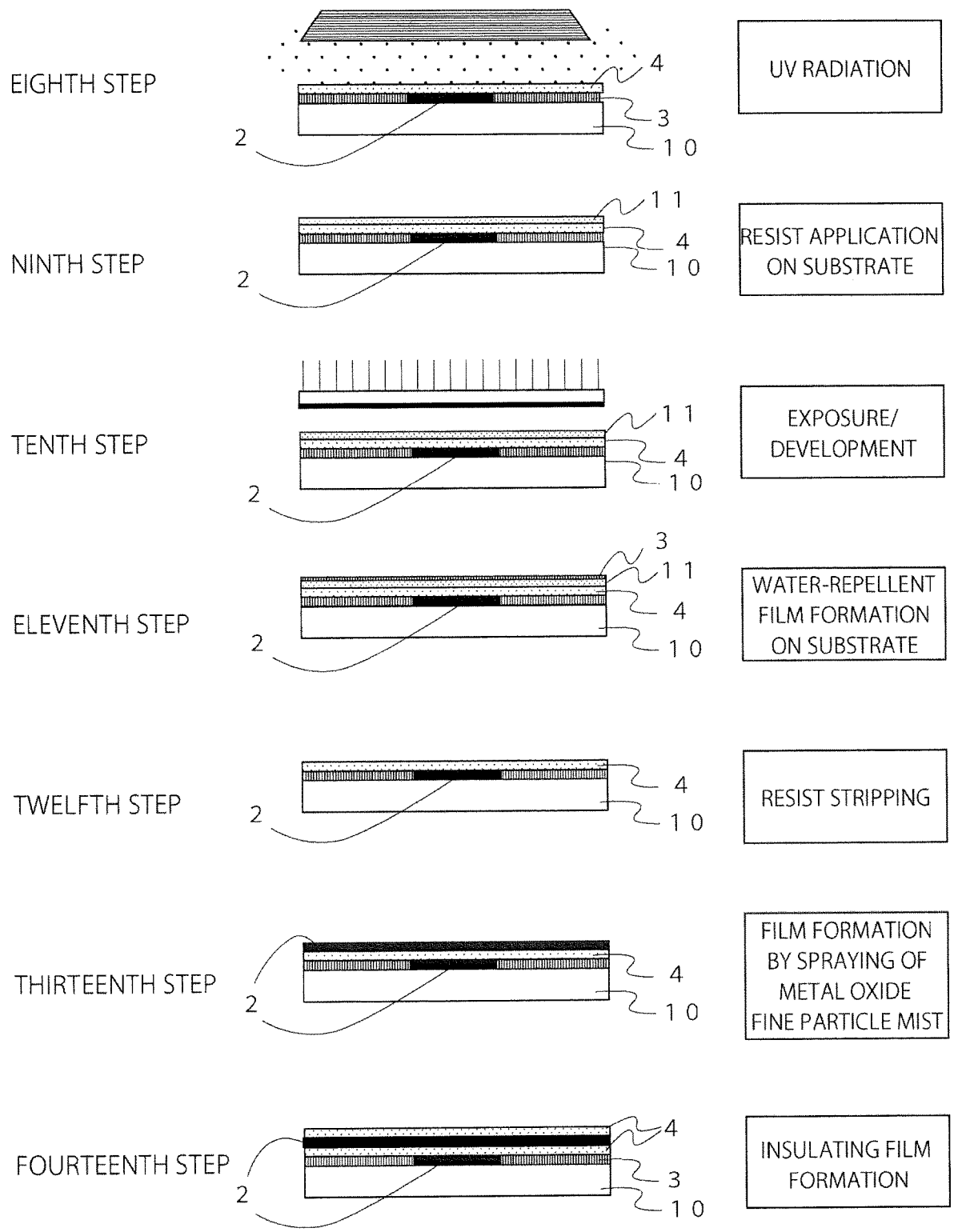
FIG. 4 is sectional views (part two) for illustrating the exemplary method of manufacturing a conductive film according to the modification example.

FIG. 4 is sectional views (part two) for illustrating the exemplary method of manufacturing a conductive film according to this modification example.

(Eighth Step)

Next, a UV ray is radiated to the substrate 10. A UV ray is radiated for the purpose of facilitating formation of the metal oxide film as the second layer on the insulating film 4.

(Ninth Step)

Next, the resist 11 is applied to the substrate 10. The application of the resist 11 is performed similarly to that in the second step.

(Tenth Step)

Then, the substrate 10 is selectively exposed and developed. In the third step, the exposure was performed using a photomask that selectively masks the substrate 10 in the x direction thereof. In this step, description is made of a case in which the exposure is performed using a photomask that selectively masks the substrate 10 in a y direction thereof (direction orthogonal to a side to side direction in FIG. 4). The exposure and the development are performed similarly to those in the third step.

(Eleventh and Twelfth Steps)

Next, the water-repellent film 3 is applied to the substrate 10. After that, the resist 11 that remains on the substrate 10 is peeled together with the water-repellent film 3 formed on the resist 11. The eleventh step and the twelfth step are performed similarly to the fourth step and the fifth step, respectively.

(Thirteenth Step)

Then, the metal oxide film 2 as the second layer is formed on the substrate 10. In forming the metal oxide film 2, similarly to the case of the sixth step, the film forming apparatus illustrated in FIG. 2 is used. After that, the metal oxide film 2 is dried. Note that, in FIG. 4, as the second layer, the metal oxide film 2 is selectively formed in the y direction of the substrate 10, and thus, in the sectional views of the substrate 10, the metal oxide film 2 as the second layer is illustrated as if being formed on the entire surface of the substrate 10.

(Fourteenth Step)

Then, the insulating film 4 is formed on the substrate 10. The insulating film 4 is formed on the metal oxide film 2 formed in the thirteenth step. The insulating film 4 is formed by a film forming method similar to that in the seventh step using a material similar to that used in the seventh step.

As described above, in this embodiment, by forming the metal oxide film having a patterned shape and forming a protective layer that is the insulating film on an outermost surface, a touch panel that operates in accordance with change in capacitance can be formed. Further, by forming the metal oxide film using the film forming apparatus described above, a metal oxide film having a lower resistance value and a higher transparency compared with a general metal oxide film can be obtained.

Figure 5:
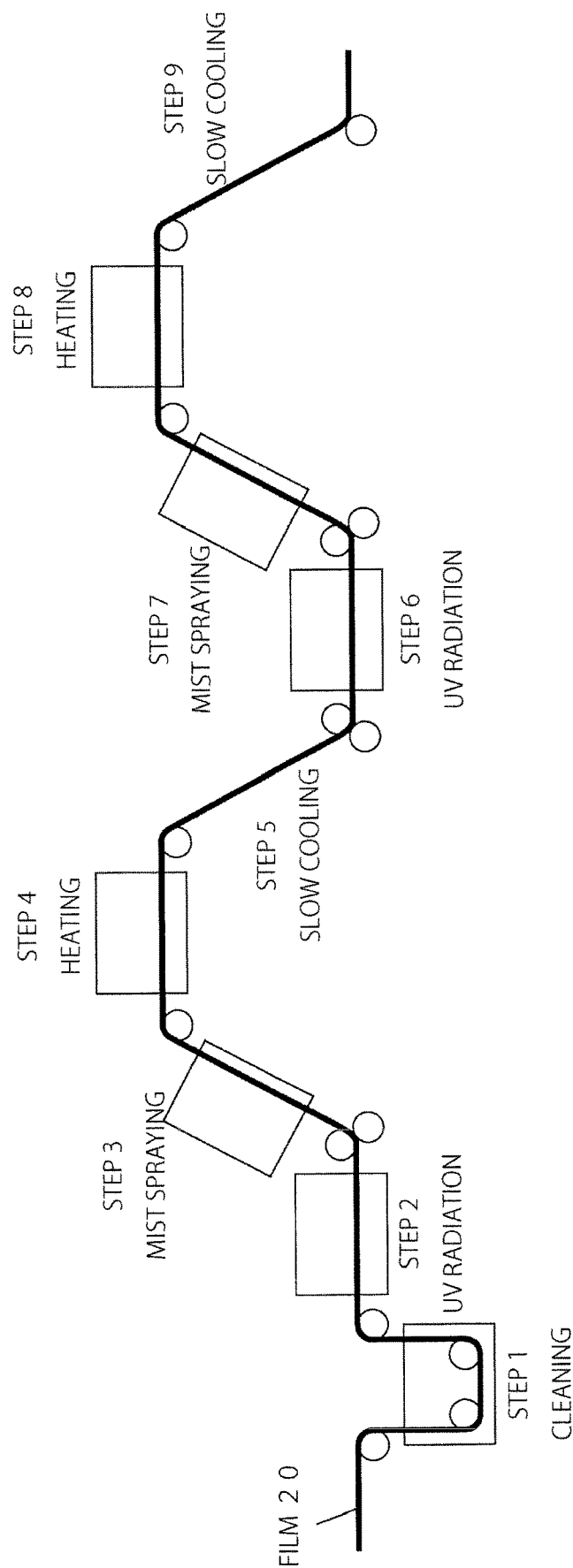
FIG. 5 is a schematic view of a roll-to-roll manufacturing apparatus.

FIG. 5 is a schematic view of a roll-to-roll manufacturing apparatus. In this manufacturing apparatus, when a film 20 formed in a roll is set on one side of the apparatus, the film 20 having a metal oxide film formed thereon is discharged from another side of the apparatus. Note that, the film 20 is used as the substrate in the embodiment described above, and contains a resin and has flexibility.

(Step 1: Cleaning)

First, the film 20 is cleaned. As a method of the cleaning, a general method such as ultrasonic cleaning is used.

(Step 2: UV Radiation)

Then, a UV ray is radiated to the film 20. As described above, in radiating a UV ray, a general UV radiation apparatus is used, and it is desired that a UV ray having a wavelength of 200 nm or less be radiated.

(Step 3: Mist Spraying)

Then, the mist generated from the dispersion liquid in which the metal oxide fine particles are dispersed is sprayed onto the film 20. A film forming apparatus used in Step 3 is the film forming apparatus described with reference to FIG. 2. Note that, as described above, the film forming apparatus forms the metal oxide film at a temperature lower than the softening point of the film 20. In this step, the film 20 having the metal oxide film attached thereto can be obtained.

(Step 4: Heating)

Then, the film 20 is heated to dry the metal oxide film attached to the film 20 in Step 3. Note that, as described above, a temperature used in the heating is lower than the softening point of the film 20.

(Step 5: Slow Cooling)

Then, the film 20 is gradually cooled. In this step, a cooling apparatus may be used to cool the film 20.

(Step 6: UV Radiation)

In this manufacturing apparatus, the metal oxide film as the second layer is formed on the formed metal oxide film. Therefore, in this step, a UV ray is radiated to the film 20 to remove an impurity, thereby improving the hydrophilic property. Note that, when formation of the metal oxide film ends when the first layer is formed, this step and subsequent steps are omitted.

(Step 7: Mist Spraying)

Then, the mist is sprayed onto the film 20. In this step, similarly to the case of Step 3, the film forming apparatus illustrated in FIG. 2 is used to form the metal oxide film on the film 20. In this step, the metal oxide film as the second layer is formed on the metal oxide film as the first layer formed in Step 3.

(Step 8: Heating)

Then, the film 20 is heated to dry the metal oxide film attached to the film 20 in Step 8.

(Step 9: Slow Cooling)

Then, the film 20 is gradually cooled.

As described above, by using the roll-to-roll manufacturing apparatus, the metal oxide film can be formed continuously on the substrate formed in a roll. Further, a temperature lower than the softening point of the substrate containing a resin and having flexibility can be used to form a high performance metal oxide film.

The embodiment of the present invention is hereinafter more specifically described by way of Examples. However, the present invention is not limited to the following Examples.

Example 1

First, a water dispersion liquid (NanoTek Slurry manufactured by C. I. Kasei Company, Limited) containing ITO fine particles was prepared. The ITO fine particles had a particle size of from 10 nm to 50 nm, and an average particle size was 30 nm. Materials and particle sizes of ITO fine particles used in other examples described below are similar to those in this example. Further, a concentration of the metal oxide fine particles in the dispersion liquid was 15 wt %. The prepared dispersion liquid was put in the first chamber of the film forming apparatus described above, and a voltage of 2.4 MHz was applied by the ultrasonic vibrator (manufactured by HONDA ELECTRONICS Co., LTD.) to generate the mist. The obtained mist was sent to the vicinity of the substrate in a second chamber by causing air to flow into the first chamber. Note that, in the film forming apparatus used in this example, the second chamber as the mist trap is omitted. Therefore, the mist was sprayed onto the substrate in the second chamber. Note that, as the substrate, a soda lime glass substrate was used.

In the second chamber, the mist continued to be sprayed onto the substrate for five minutes under a state in which the substrate was tilted from the horizontal plane and the substrate was tilted from the plane orthogonal to the direction of the spraying of the mist by 45 degrees. At this time, the substrate was not heated, and the spraying was performed at room temperature.

After the mist was sprayed onto the substrate, an infrared lamp heating apparatus was used to perform the heating in different patterns of from 100° C. to 200° C. The heating was performed for ten minutes in a low vacuum of about 30 Pa using a rotary pump, or in an atmosphere of an inert gas (Ar).

After that, a UV ray (mixture of 254 nm and 185 nm) was radiated to a dried surface of the ITO film. Then, subsequently thereto, similarly to the case described above, the substrate was set in the second chamber of the film forming apparatus, and the mist continued to be sprayed for five minutes at room temperature. After that, similarly to the case described above, by performing the heating for ten minutes using the infrared lamp heating apparatus, the substrate was dried.

(Evaluation)

Figure 6:
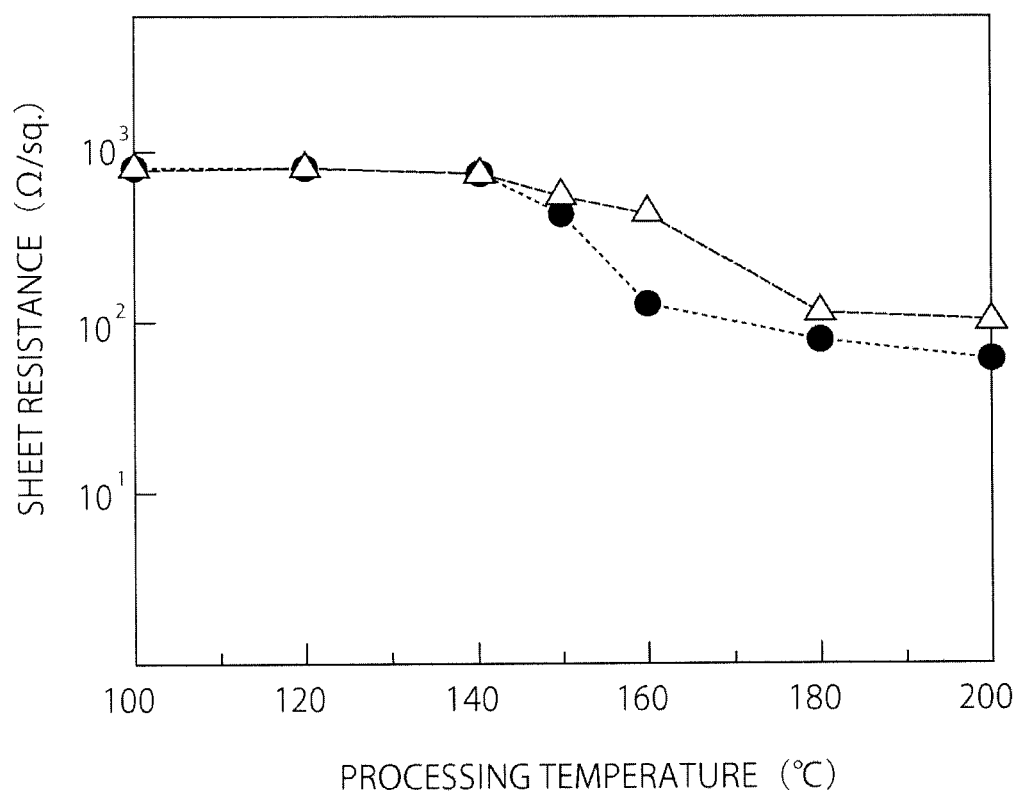
FIG. 6 is a graph for showing sheet resistance versus heating/drying temperature.

FIG. 6 is a graph for showing sheet resistance versus heating/drying temperature. Note that, the sheet resistance shown in this figure was measured by a four probe method. With reference to data shown in FIG. 6, it was found that, in a low temperature region of 200° C. or lower, which is temperature at which the film that formed the substrate is heat-resistant, sheet resistances of less than 1,000 Ω/sq. was obtained.

Further, when the process under atmospheric pressure in an atmosphere of the inert gas (Ar) and the process in the low vacuum of about 30 Pa were studied, it was found that the process in the low vacuum exhibited lower resistances in a temperature region of 150° C. or higher.

Note that, when transmittances of the obtained samples were measured using a spectrophotometer at a wavelength of 550 nm, all the samples shown in FIG. 6 exhibited visible light transmittances of 80% or higher.

Figure 7:
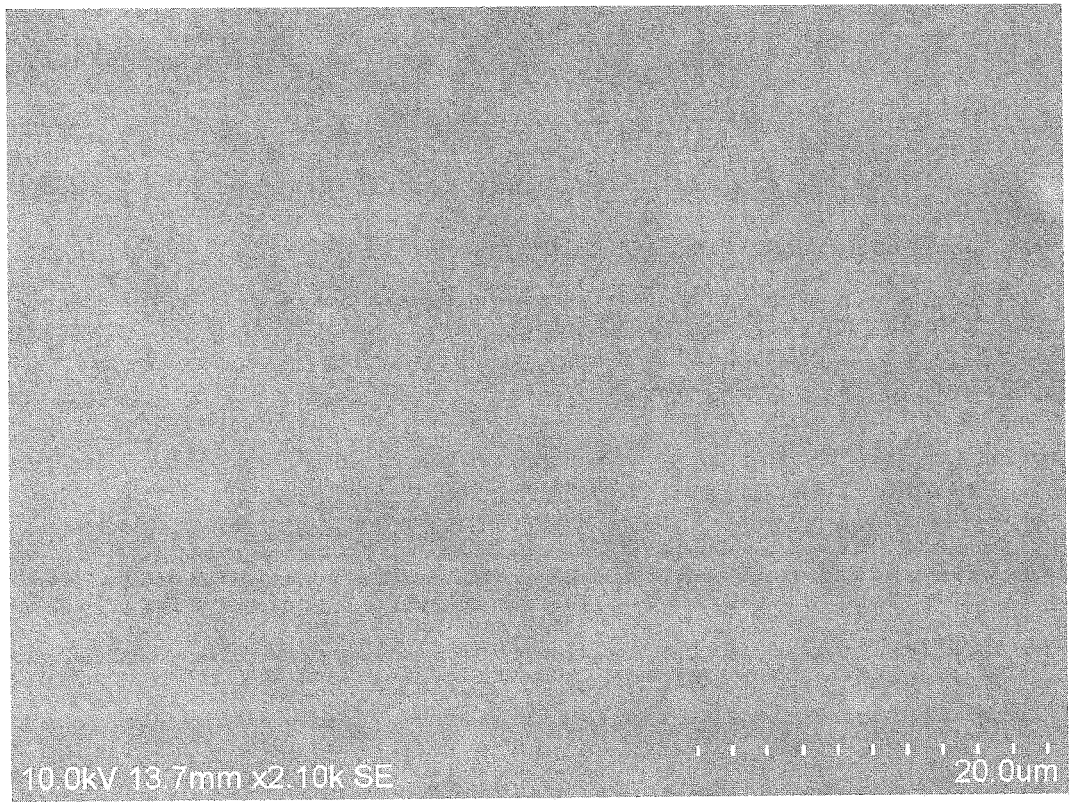
FIG. 7 is a SEM image of an obtained ITO film.

FIG. 7 is a SEM image of an obtained ITO film. FIG. 7 is an image of a surface of a sample in the case in which the heating temperature when the sample was dried was 200° C., which was observed under a scanning electron microscope (SEM). No irregularities are observed on the surface and smoothness can be confirmed.

As described above, it was clarified that the metal oxide films formed using the mist exhibited low sheet resistances. Further, it was found that metal oxide films that did not lose a light transmitting property and that had smoothness was formed.

Example 2

A water dispersion liquid containing ITO fine particles was put in the first chamber of the film forming apparatus described above that did not have the mist trap, and a voltage of 2.4 MHz was applied by the ultrasonic vibrator (manufactured by HONDA ELECTRONICS Co., LTD.) to generate the mist. The obtained mist was sent to the vicinity of the substrate in the second chamber by causing air to flow into the first chamber. Note that, as the substrate, a soda lime glass substrate was used.

In the second chamber, the mist continued to be sprayed onto the substrate for five minutes under a state in which the substrate was tilted from the horizontal plane and the substrate was tilted from the plane orthogonal to the direction of the spraying of the mist. At this time, substrates were prepared having different substrate temperatures that were set to be from 20° C. to 200° C. After that, the substrates were dried at room temperature.

Sheet resistances of metal oxide films having the different substrate temperatures in the film formation that were obtained at this time were measured by the four probe method.

FIG. 8 is a table for showing sheet resistances of the obtained metal oxide films for the various heating/drying temperatures. With regard to samples in which the substrate temperature in the film formation was raised from room temperature, increase in sheet resistance, that is, reduction in electric conductivity, was confirmed. Further, with regard to samples in which the substrate was heated to a temperature of 80° C. or higher, the sheet resistances were beyond a detection limit, and thus, the measurement was impossible. Note that, the detection limit in this measurement was 4 GΩ/sq.

As described above, when the substrate temperature in the film formation was 60° C. or lower, a metal oxide film having electric conductivity was obtained. Further, when the substrate temperature was 25 degrees, which is close to room temperature, a metal oxide film having the highest electric conductivity was obtained.

Comparative Example 1

A water dispersion liquid containing ITO fine particles was applied onto the substrate 10 by spin coating at 500 rpm. The application was performed at room temperature. After the application, the heating for drying was performed at a temperature of 200° C. for about ten minutes in a low vacuum of about 30 Pa. After that, a UV ray (mixture of 254 nm and 185 nm) was radiated to a surface of the film. Then, subsequently thereto, a water dispersion liquid containing ITO fine particles was applied at room temperature onto the substrate by spin coating at 500 rpm. After the application, heating for drying was performed at a temperature of 200°

C. for about ten minutes in a low vacuum of about 30 Pa. Note that, as the substrate, a soda lime glass substrate was used.

When a transmittance of the obtained ITO film was measured using a spectrophotometer at a wavelength of 550 nm, the visible light transmittance was 68%. Further, when a sheet resistance of the obtained ITO film was measured by the four probe method, the result was 800 MΩ/sq.

Figure 9:
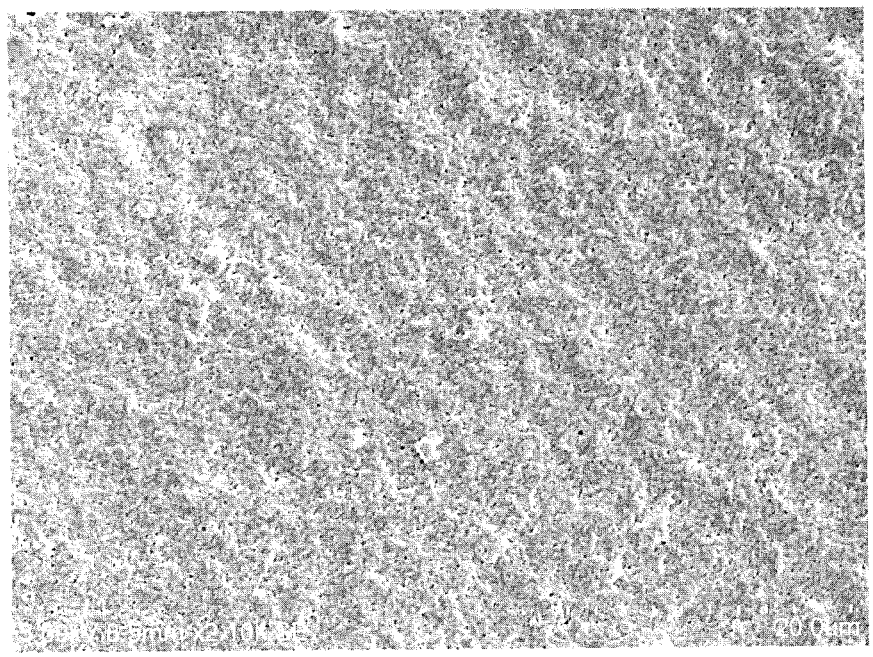
FIG. 9 is a SEM image of an obtained ITO film of a comparative example.

FIG. 9 is a result of an observation of the surface by a SEM image. It was confirmed that, when the film was formed using spin coating, compared with the case of the SEM image in FIG. 7 when the film was formed using the mist, the surface was rougher. The surface resistance value was higher than that of the case in which the film was formed using the mist by three orders of magnitude, and it cannot be said that the ITO film of this comparative example 1 is at a practical level as a transparent electrode.

Further, surface roughnesses were measured using a stylus type thickness meter. In Example 1, the sample which was heated and dried at 200° C. similarly to the case of this comparative example had a surface roughness Ra of 15 nm. On the other hand, the film obtained in this comparative example had a surface roughness Ra of 80 nm.

As described above, it was found that, compared with the film formed by spraying, onto the substrate, the mist of the dispersion liquid containing the metal oxide fine particles, the film formed by applying the dispersion liquid by spin coating had a rougher surface, a higher resistance value, and a lower visible light transmittance.

Example 3

First, a water dispersion liquid (NanoTek Slurry manufactured by C. I. Kasei Company, Limited) containing GZO fine particles was prepared. The GZO fine particles had a particle size of 10 nm to 50 nm, and an average particle size was 30 nm. Materials and particle sizes of GZO fine particles used in other examples described below are similar to those in this example. Further, a concentration of the metal oxide fine particles in the dispersion liquid was 15 wt %.

The prepared dispersion liquid was put in the first chamber of the film forming apparatus described above that did not have the mist trap, and a voltage of 2.4 MHz was applied by the ultrasonic vibrator (manufactured by HONDA ELECTRONICS Co., LTD.) to generate the mist. The obtained mist was sent to the vicinity of the substrate in the second chamber by causing air to flow into the first chamber. Note that, as the substrate, a soda lime glass substrate was used.

In the second chamber, the mist continued to be sprayed onto the substrate for five minutes under a state in which the substrate was tilted from the horizontal plane and the substrate was tilted from the plane orthogonal to the direction of the spraying of the mist. At this time, the substrate was not heated, and the spraying was performed at room temperature.

After the mist was sprayed onto the substrate, an infrared lamp heating apparatus was used to heat the substrate at 150° C., 175° C., and 200° C. in respective cases. The heating was performed for about ten minutes in a low vacuum of about 30 Pa for each of the heating temperatures.

After that, a UV ray (mixture of 254 nm and 185 nm) was radiated to a dried surface of the GZO film. Then, subsequently thereto, similarly to the case described above, the substrate was set in the second chamber of the film forming apparatus, and the mist continued to be sprayed for five minutes at room temperature. After that, similarly to the case described above, by performing the heating for ten minutes using the infrared lamp heating apparatus, the substrate was dried.

FIG. 10 is a table for showing surface resistance values and visible light transmittances of the obtained GZO films. It was found that, in any of the cases in which the drying temperature was 150° C., 175° C., and 200° C., a transparent conductive film exhibiting a transmittance of 80% or higher in a visible light region was obtained. Further, in any of the cases, the sheet resistance was 20 MΩ/sq. or less.

As described above, it was found that, even when GZO fine particles were used as the metal oxide fine particles, a suitable metal oxide film was obtained.

Example 4

First, an IPA dispersion liquid (NanoTek Slurry manufactured by C. I. Kasei Company, Limited) containing GZO fine particles was prepared. A particle size of the GZO fine particles and a concentration of the metal oxide fine particles are similar to those in Example 3. The prepared dispersion liquid was put in the first chamber of the film forming apparatus described above that did not have the mist trap, and a voltage of 2.4 MHz was applied by the ultrasonic vibrator (manufactured by HONDA ELECTRONICS Co., LTD.) to generate the mist. The obtained mist was sent to the vicinity of the substrate in the second chamber by causing air to flow into the first chamber.

After the mist was sprayed onto the substrate, an infrared lamp heating apparatus was used to perform the heating for drying at a temperature of 200° C. for ten minutes in a low vacuum of about 30 Pa. After that, a UV ray (mixture of 254 nm and 185 nm) was radiated to a dried surface of the GZO film. Then, subsequently thereto, similarly to the case described above, the substrate was set in the second chamber of the film forming apparatus, and the mist continued to be sprayed for five minutes at room temperature. After that, similarly to the case described above, by performing the heating for ten minutes using the infrared lamp heating apparatus, the substrate was dried. Note that, as the substrate, a soda lime glass substrate was used.

The obtained film had a sheet resistance of 10 MΩ/sq. and a transmittance in the visible light region was 80% or more.

Figure 11:
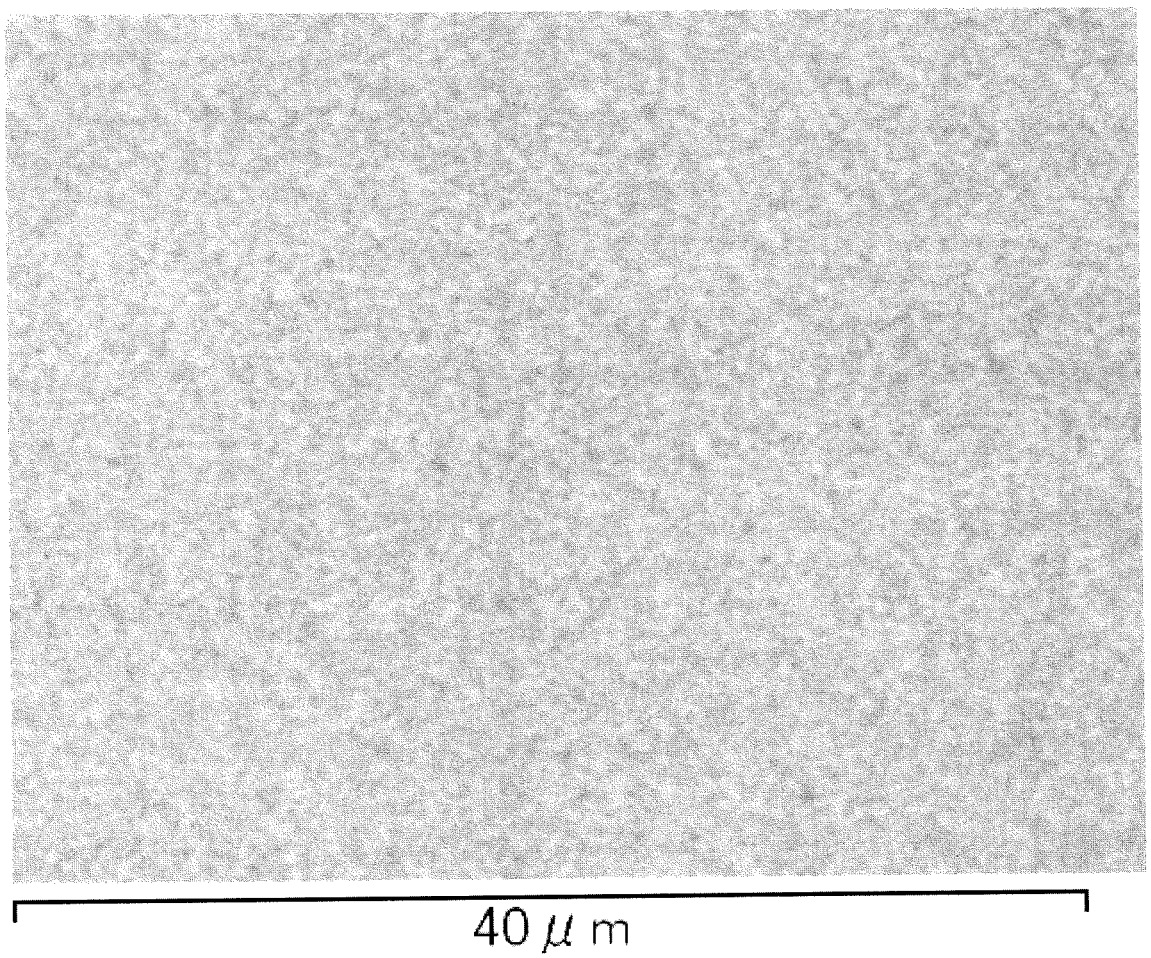
FIG. 11 is a SEM image of an obtained GZO film.

FIG. 11 is a SEM image of the obtained GZO film. From the result of the SEM image, it was found that a flat film was formed.

Figure 12:
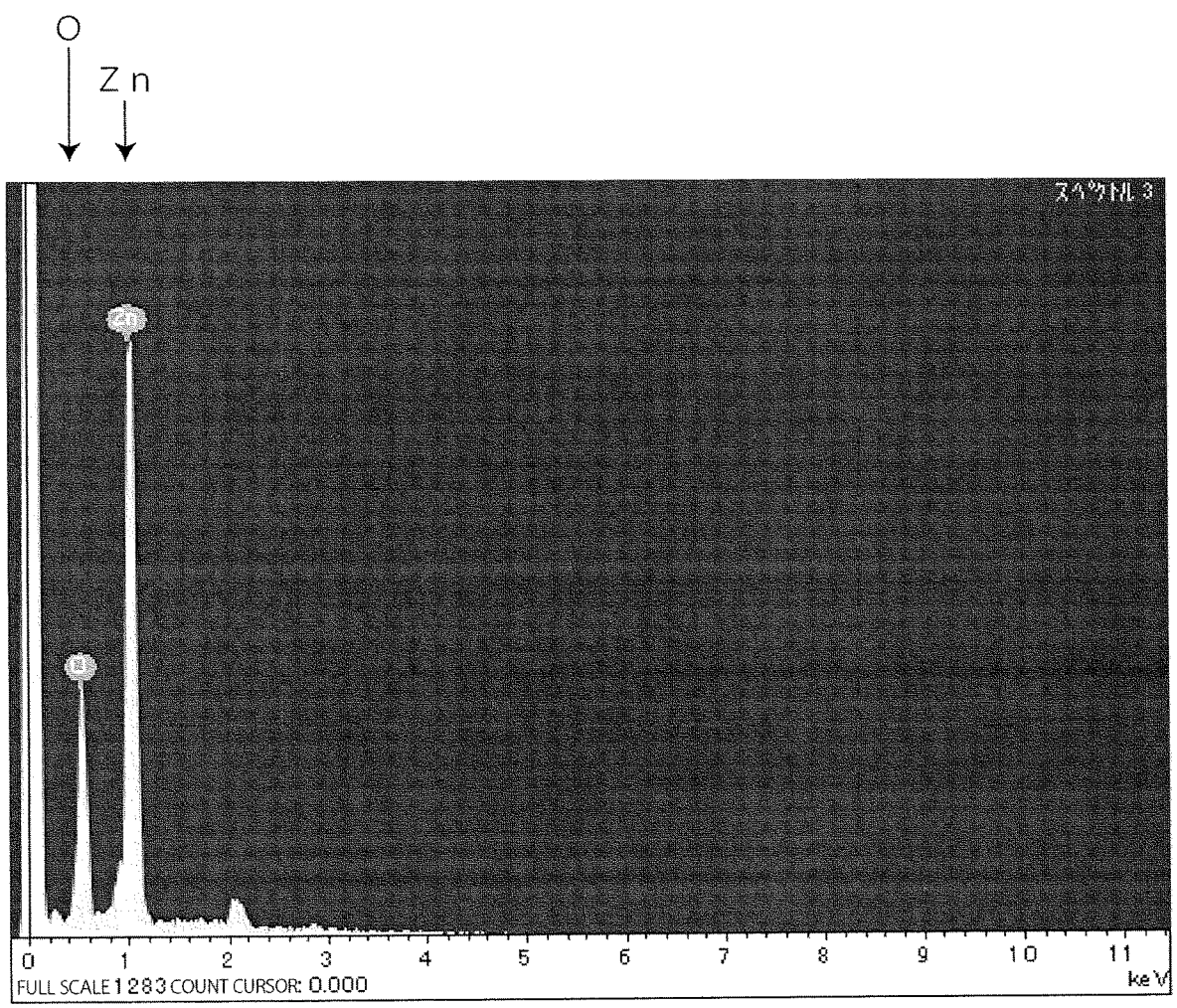
FIG. 12 is a graph for showing a result of analysis of an obtained GZO film by EDX.

FIG. 12 is a graph for showing a result of analysis of the obtained GZO film by EDX. Specifically, the obtained GZO film was line scanned by Energy dispersive X-ray spectrometry (EDX). In FIG. 12, prominent peaks were observed for Zn and O, respectively, and it was found that the obtained film was formed of ZnO.

Example 5

Similarly to the case of Example 3, a water dispersion liquid (NanoTek Slurry manufactured by C. I. Kasei Company, Limited) containing GZO fine particles was prepared. The prepared dispersion liquid was put in the first chamber of the film forming apparatus described above that did not have the mist trap, and a voltage of 2.4 MHz was applied by the ultrasonic vibrator (manufactured by HONDA ELECTRONICS Co., LTD.) to generate the mist. The obtained mist was sent to the vicinity of the substrate in the second chamber by causing air to flow into the first chamber.

In the second chamber, the mist continued to be sprayed onto the substrate for five minutes under a state in which the substrate was tilted from the horizontal plane and the substrate was tilted from the plane orthogonal to the direction of the spraying of the mist. At this time, one substrate was heated to 60° C. when the spraying was performed, and another substrate was heated to 80° C. when the spraying was performed. Note that, as the substrate, a soda lime glass substrate was used.

After that, an infrared lamp heating apparatus was used to heat the substrate at a temperature of 200° C. The heating was performed for ten minutes in a low vacuum of about 30 Pa. Subsequently thereto, after a UV ray (mixture of 254 nm and 185 nm) was radiated to a surface of the GZO film, similarly to the case described above, the substrate was set in the second chamber of the film forming apparatus, and similarly, the mist continued to be sprayed for five minutes while the substrate was heated. After that, similarly to the case described above, by performing the heating for ten minutes using the infrared lamp heating apparatus, the substrate was dried.

FIG. 13 is SEM images of the obtained GZO films. When geometries of the surfaces were observed using the SEM images, it was confirmed that the GZO film formed on the heated substrate lost smoothness of the surface thereof.

FIG. 14 is a table for showing a relationship between the substrate temperature in the film formation and the surface resistance. As the heating temperature in the film formation rises, the surface resistance value considerably increases. Note that, when the heating temperature in the film formation was 80° C., the surface resistance value was beyond a detection limit, and thus, the measurement was impossible.

Example 6

A spin coater was used to uniformly apply the resist on the substrate. Exposure was performed with i-rays, and a pattern having a line and space of 100 μm was formed. After that, a dip coater was used to apply 3M™Novec™EGC-1720 (manufactured by 3M Japan Limited) as the water repellent to the substrate. By peeling the resist, the substrate having a desired water-repellent pattern formed thereon was obtained. Note that, as the substrate, a PET substrate was used.

Then, similarly to the case of Example 1, a water dispersion liquid containing ITO fine particles was put in the first chamber of the film forming apparatus described above that did not have the mist trap, and a voltage of 2.4 MHz was applied by the ultrasonic vibrator (manufactured by HONDA ELECTRONICS Co., LTD.) to generate the mist. The obtained mist was sent to the vicinity of the substrate in the second chamber by causing air to flow into the first chamber.

In the second chamber, the mist continued to be sprayed onto the substrate for five minutes under a state in which the substrate was tilted from the horizontal plane and the substrate was tilted from the plane orthogonal to the direction of the spraying of the mist. At this time, the substrate was not heated, and the mist was sprayed at room temperature.

After that, an infrared lamp heating apparatus was used to heat the substrate at a temperature of 150° C. The heating was performed for ten minutes in a low vacuum of about 30 Pa. Subsequently thereto, after a UV ray (mixture of 254 nm and 185 nm) was radiated to a surface of the film formed on the substrate, similarly to the case described above, the substrate was set in the second chamber of the film forming apparatus, and the mist continued to be sprayed for five minutes. After that, similarly to the case described above, by performing the heating for ten minutes using the infrared lamp heating apparatus, the substrate was dried.

Figure 15:
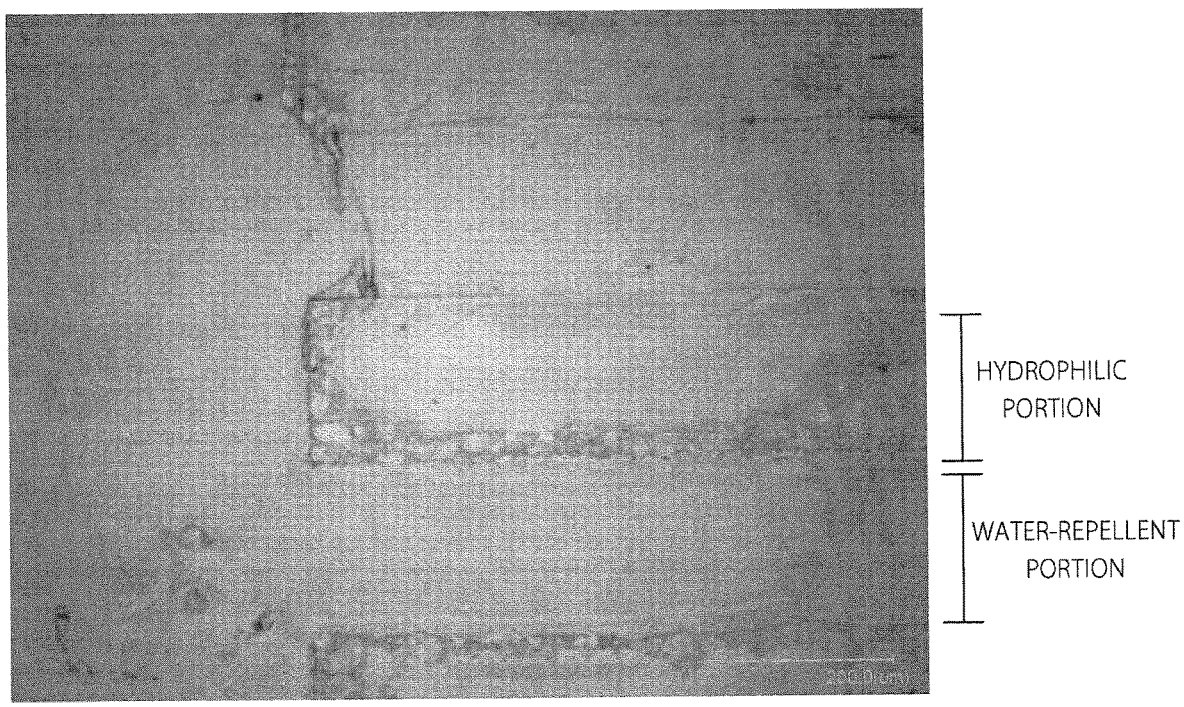
FIG. 15 is a SEM image of an ITO film on a water-repellent patterned substrate.

FIG. 15 is a SEM image of the ITO film on the water-repellent patterned substrate. The ITO film was formed on a hydrophilic portion without being formed on a water-repellent portion.

As described above, when a metal oxide film was formed by spraying the mist of the dispersion liquid containing the ITO fine particles, with the usage of the water-repellent pattern, the metal oxide film in an intended pattern was selectively formed.

Example 7

A spin coater was used to uniformly apply the resist on the substrate. Exposure was performed with i-rays, and a pattern having a line and space of 100 μm was formed. After that, a dip coater was used to apply 3M™Novec™EGC-1720 (manufactured by 3M Japan Limited) as the water repellent to the substrate. By peeling the resist, the substrate having a desired water-repellent pattern formed thereon was obtained. Note that, as the substrate, a PET substrate was used.

Then, similarly to the case of Example 3, a water dispersion liquid containing GZO fine particles was prepared and put in the first chamber of the film forming apparatus that did not have the mist trap, and a voltage of 2.4 MHz was applied by the ultrasonic vibrator (manufactured by HONDA ELECTRONICS Co., LTD.) to generate the mist. The obtained mist was sent to the vicinity of the substrate in the second chamber by causing air to flow into the first chamber. In the second chamber, the mist continued to be sprayed onto the substrate for five minutes under a state in which the substrate was tilted from the horizontal plane and the substrate was tilted from the plane orthogonal to the direction of the spraying of the mist. At this time, the substrate was not heated, and the spraying was performed at room temperature.

After that, an infrared lamp heating apparatus was used to heat the substrate at a temperature of 150° C. The heating was performed for ten minutes in a low vacuum of about 30 Pa. Subsequently thereto, after a UV ray (mixture of 254 nm and 185 nm) was radiated to a surface of the film formed on the substrate, similarly to the case described above, the substrate was set in the second chamber of the film forming apparatus, and the mist continued to be sprayed for five minutes. After that, similarly to the case described above, by performing the heating for ten minutes using the infrared lamp heating apparatus, the substrate was dried.

Figure 16:
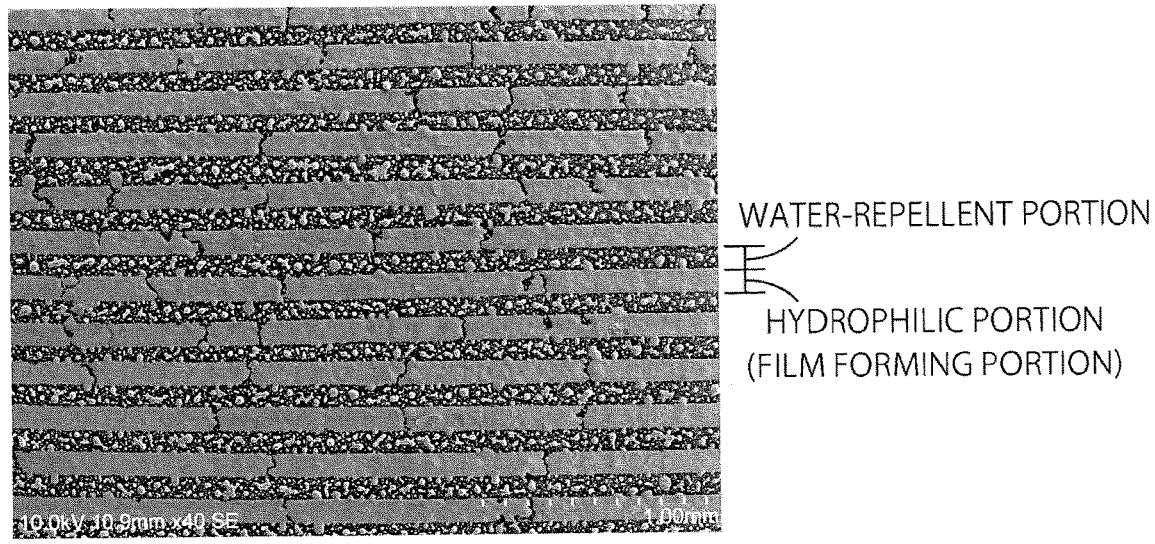
FIG. 16 is a SEM image of a GZO film on a water-repellent patterned substrate.

FIG. 16 is a SEM image of the GZO film on the water-repellent patterned substrate. It was confirmed that the state was different between the water-repellent portion with water-repellent coating and the hydrophilic portion other than the water-repellent portion.

Comparative Example 2

A spin coater was used to uniformly apply the resist on the substrate. Exposure was performed with i-rays, and a pattern having a line and space of 100 μm was formed. After that, a dip coater was used to apply 3M™Novec™EGC-1720 (manufactured by 3M Japan Limited) as the water repellent to the substrate. By peeling the resist, the substrate having a desired water-repellent pattern formed thereon was obtained. Note that, as the substrate, a PET substrate was used.

Similarly to the case of Example 1, a water dispersion liquid (NanoTek Slurry manufactured by C. I. Kasei Company, Limited) containing ITO fine particles was prepared and put in the first chamber of the film forming apparatus described above that did not have the mist trap, and a voltage of 2.4 MHz was applied by the ultrasonic vibrator (manufactured by HONDA ELECTRONICS Co., LTD.) to generate the mist. The obtained mist was sent to the vicinity of the substrate in the second chamber by causing air to flow into the first chamber.

In the second chamber, a substrate heated to 60° C. and a substrate heated to 80° C. were set, and the mist continued to be sprayed to the respective substrates for five minutes. At this time, while the spraying was performed, the substrates were set under a state of being tilted from the horizontal plane and being tilted from the plane orthogonal to the direction of the spraying of the mist by 45 degrees. After that, an infrared lamp heating apparatus was used to heat the substrate at a temperature of 150° C. The heating was performed for ten minutes in a low vacuum of about 30 Pa.

Figure 17:
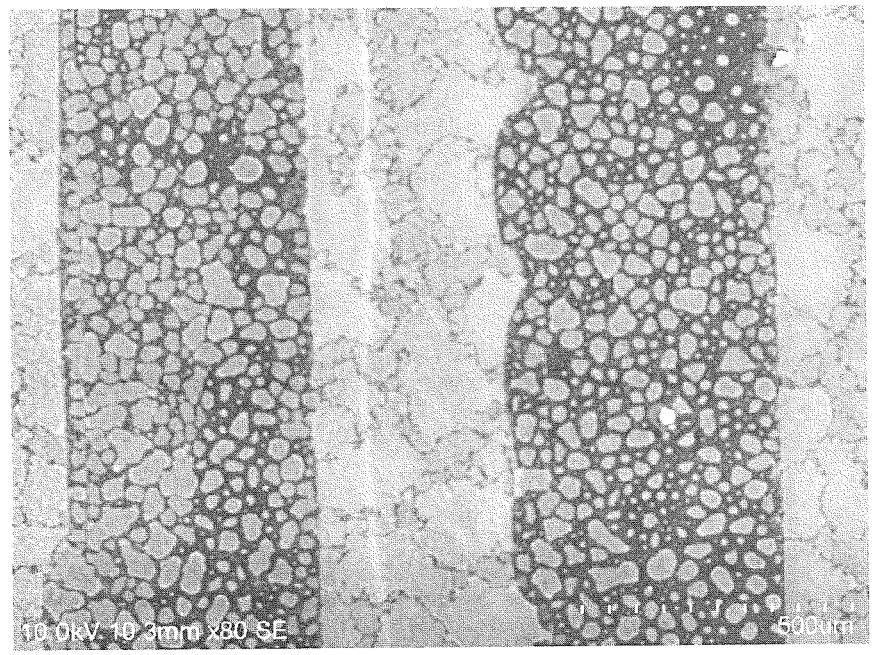
FIG. 17 is a SEM image of a substrate heated to 60° C.

FIG. 17 is a SEM image of the substrate heated to 60° C. It is thought that, the velocity of vaporization of the dispersion liquid containing the metal oxide fine particles on the heated substrate is extremely high, and thus, the dispersion liquid attached to the water-repellent portion was vaporized without being repelled. Therefore, it was confirmed that the metal oxide film of a very small quantity was formed even in the water-repellent portion.

Figure 18:
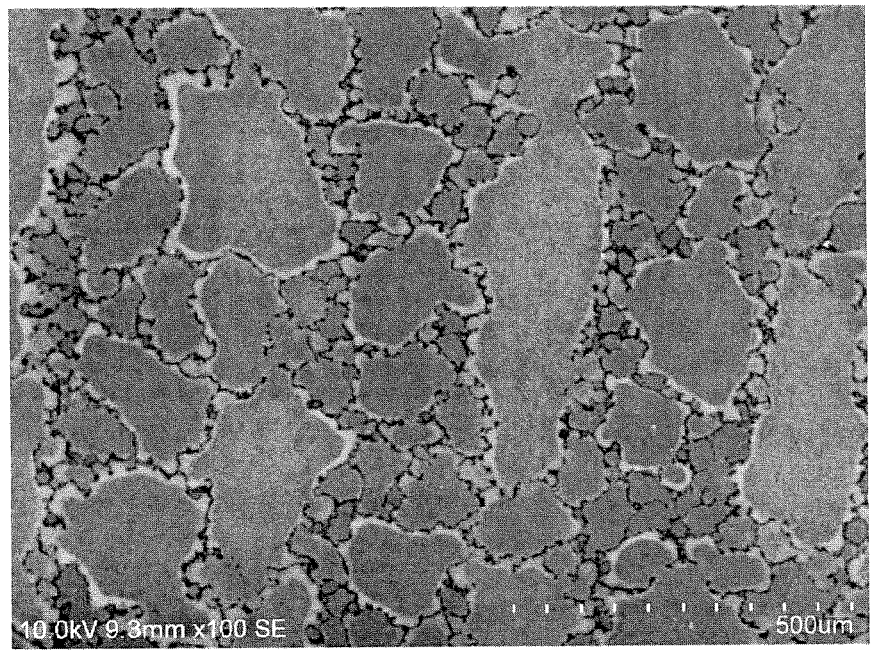
FIG. 18 is a SEM image of a substrate heated to 80° C.

FIG. 18 is a SEM image of the substrate heated to 80° C. It was confirmed that the metal oxide film was formed entirely irrespective of whether on the hydrophilic portion or on the water-repellent portion. As a result, patterning along a line was not obtained.

Comparative Example 3

A spin coater was used to uniformly apply the resist on the substrate. Exposure was performed with i-rays, and a pattern having a line and space of 100 μm was formed. After that, a dip coater was used to apply 3M™Novec™EGC-1720 (manufactured by 3M Japan Limited) as the water repellent to the substrate. By peeling the resist, the substrate having a desired water-repellent pattern formed thereon was obtained. Note that, as the substrate, a PET substrate was used.

Similarly to the case of Example 1, a water dispersion liquid (NanoTek Slurry manufactured by C. I. Kasei Company, Limited) containing ITO fine particles was prepared and put in the first chamber of the film forming apparatus described above that had the mist trap, and a voltage of 2.4 MHz was applied by the ultrasonic vibrator (manufactured by HONDA ELECTRONICS Co., LTD.) to generate the mist. The obtained mist was sent to the vicinity of the substrate in the third chamber by causing air to flow into the first chamber.

In the third chamber, the substrate was set so as to be in parallel with the horizontal plane and so as to be in parallel with the plane orthogonal to the direction of the spraying of the mist, and the mist continued to be sprayed for five minutes. At this time, the substrate was not heated, and the spraying was performed at room temperature.

After that, an infrared lamp heating apparatus was used to heat the substrate at a temperature of 200° C. The heating was performed for ten minutes in a low vacuum of about 30 Pa. Subsequently thereto, after a UV ray (mixture of 254 nm and 185 nm) was radiated to a surface of a film formed on the substrate, similarly to the case described above, the substrate was set in the third chamber of the film forming apparatus. Note that, the substrate was set so as to be in parallel with the horizontal plane and so as to be in parallel with the plane orthogonal to the direction of the spraying of the mist. After the mist continued to be sprayed onto the substrate for five minutes, similarly to the case described above, by performing the heating for ten minutes using the infrared lamp heating apparatus, the substrate was dried.

Figure 19:
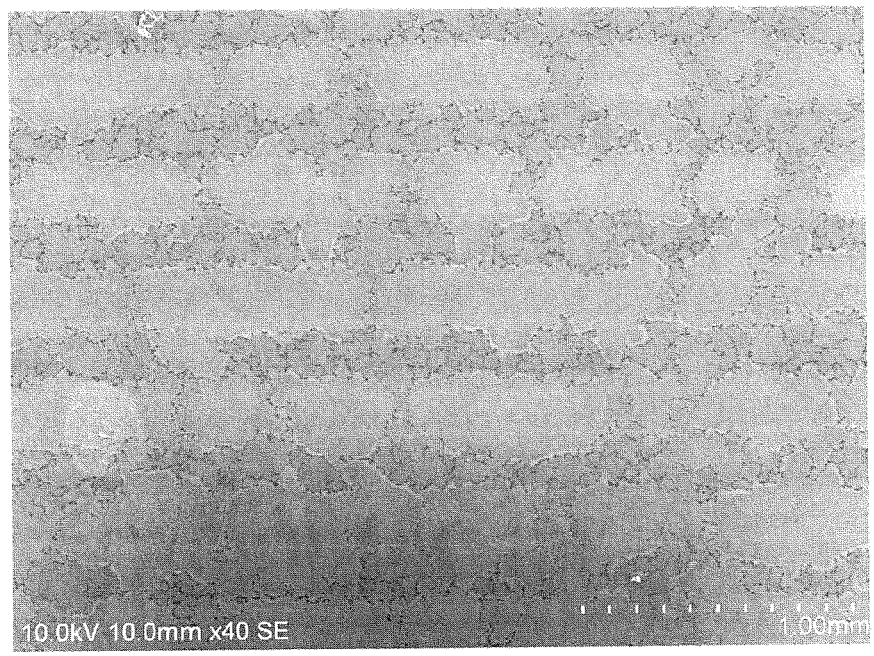
FIG. 19 is a SEM image of an obtained ITO film.

FIG. 19 is a SEM image of the obtained ITO film. The metal oxide film was formed on the entire substrate almost irrespective of whether on the hydrophilic portion or on the water-repellent portion. This is thought to be because the dispersion liquid containing the metal oxide fine particles that were attached to the water-repellent portion was vaporized without being repelled. As a result, patterning along a line as observed in Example 6 was not obtained.

Results of <Example 2> and <Comparative Example 1> are now discussed. It was found that, compared with a case in which the dispersion liquid containing the metal oxide fine particles was applied to the substrate by spin coating, when the film was formed by the film forming apparatus using the mist, the visible light transmittance was higher and the sheet resistance was lower. Further, it was found that, when the temperature of the substrate in the film formation was 40° C. or lower, a suitable metal oxide film having a low sheet resistance was obtained.

Further, results of <Example 1>, <Example 3>, and <Example 4> are now discussed. A suitable metal oxide film was obtained both when the metal oxide fine particles were ITO and when the metal oxide fine particles were GZO. Further, a suitable metal oxide film was obtained both when the dispersion medium was water and when the dispersion medium was IPA.

Results of <Example 6>, <Comparative Example 2>, and <Comparative Example 3> are now discussed. By forming the water-repellent film, the metal oxide film suitably patterned by the film forming apparatus using the mist was obtained. At that time, when the substrate was heated to 60° C. or higher, the metal oxide film was formed on the entire surface of the substrate, and it was difficult to form the pattern. Further, it was found that, by tilting the substrate from the horizontal plane and tilting the substrate from the plane orthogonal to the direction of the spray in the film formation, the suitably patterned metal oxide film was obtained.

What is claimed is:

1. A film forming apparatus comprising:
    a first chamber configured to generate a mist of a dispersion liquid, and including an outlet;
    a second chamber configured to receive the generated mist from the first chamber and collect particles of the generated mist having a size greater than a predetermined value, and including an inlet provided on a top of the second chamber and connected to the outlet of the first chamber, and an outlet provided on the top of the second chamber and configured to transfer, as homogenized mist, particles of the generated mist having a size less than or equal to the predetermined value due to the effect of gravity on the particles of the mist; and
    a third chamber configured to receive the homogenized mist from the second chamber and supply the received homogenized mist to a substrate to form a film on the substrate, and including an inlet connected to the outlet of the second chamber.

2. A transparent conductive film, which is manufactured by the film forming apparatus of claim 1.

3. The film forming apparatus of claim 1, wherein the predetermined value is approximately 100 nm.

4. The film forming apparatus of claim 1, wherein the substrate comprises a resin and has flexibility.

5. The film forming apparatus of claim 1, wherein the substrate is tilted from a horizontal plane.

6. The film forming apparatus of claim 1, wherein the substrate is tilted from a plane orthogonal to a direction of the supply of the received homogenized mist.

7. The film forming apparatus of claim 1, wherein the mist is generated by an ultrasonic vibrator.

8. The film forming apparatus of claim 1, wherein the mist comprises metal oxide particles comprising at least one of indium, zinc, tin, and titanium.

* * * * *